US012616168B2

(12) United States Patent (10) Patent No.: US 12,616,168 B2
Petrillo (45) Date of Patent: May 5, 2026

(54) MODULAR AND INTERLOCKING FOLDABLE PORTABLE DOG BED

(71) Applicant: Lifetime Decoys LLC, Austin, TX (US)

(72) Inventor: Matt Petrillo, Austin, TX (US)

(73) Assignee: LifeTime Decoys LLC, Austin, TX (US)

( * ) Notice: Subject to any disclaimer, the term of this patent is extended or adjusted under 35 U.S.C. 154(b) by 0 days.

(21) Appl. No.: 18/802,171

(22) Filed: Aug. 13, 2024

(65) Prior Publication Data

US 2026/0047546 A1 Feb. 19, 2026

(51) Int. Cl.
A01K 1/035 (2006.01)

(52) U.S. Cl.
CPC .................................. A01K 1/0353 (2013.01)

(58) Field of Classification Search
CPC ...................................................... A01K 1/0353
See application file for complete search history.

(56) References Cited

U.S. PATENT DOCUMENTS

| | | | | |
|---|---|---|---|---|
| 2,671,427 A | * | 3/1954 | Fell ....................... | A01K 1/0107 |
| | | | | 119/166 |
| 2,936,102 A | * | 5/1960 | Field .................... | A01K 1/0353 |
| | | | | 119/28.5 |
| 3,173,398 A | * | 3/1965 | Raymond .............. | A01K 1/035 |
| | | | | 119/28.5 |
| 3,694,983 A | * | 10/1972 | Couquet ................. | E04F 15/10 |
| | | | | 428/57 |
| 4,147,129 A | * | 4/1979 | Ruplen ................ | A01K 1/0353 |
| | | | | 119/28.5 |
| 4,198,718 A | * | 4/1980 | Ballard ................ | A01K 1/0353 |
| | | | | 5/99.1 |
| 5,066,000 A | * | 11/1991 | Dolan ................ | A63B 23/0464 |
| | | | | 472/92 |
| 5,161,484 A | * | 11/1992 | Duane .................... | A01K 1/035 |
| | | | | 5/426 |
| 5,211,130 A | * | 5/1993 | Elias .................... | A01K 1/0353 |
| | | | | 119/28.5 |
| 5,881,677 A | * | 3/1999 | Schmitt ................ | A01K 1/0157 |
| | | | | 119/526 |
| 6,102,086 A | * | 8/2000 | Holtby .................. | F16N 31/006 |
| | | | | 141/311 A |
| 7,267,077 B1 | * | 9/2007 | Brassfield ............ | A01K 1/0353 |
| | | | | 119/28.5 |

(Continued)

*Primary Examiner* — Jessica B Wong
(74) *Attorney, Agent, or Firm* — Robert R. Riddle; Jennifer C. Black; Reed Smith LLP

(57) ABSTRACT

A portable dog bed includes a base. The base includes a first base body, a second base body, a first extension body, a first hinge, a second hinge, and a third hinge. The first base body and second base body each include upper base surfaces, bottom base surfaces, and handles. The first extension body and second extension body each include first bottom extension surfaces, upper extension surfaces, locking tabs, and handle recesses. The first hinge, second hinge, and third hinge are disposed between and foldably connect the first base body and the second base body; the first base body and the first extension body; and the second base body and the second extension body, respectively. The portable dog bed is configured to be moveable between a folded position and an unfolded position.

18 Claims, 13 Drawing Sheets

(56)                References Cited

U.S. PATENT DOCUMENTS

| | | | |
|---|---|---|---|
| 7,621,235 B2* | 11/2009 | Genitrini | A01K 15/025 |
| | | | 119/706 |
| 8,661,588 B1* | 3/2014 | Leach | A47D 15/001 |
| | | | 5/655 |
| 9,363,976 B2* | 6/2016 | Martin | A01K 1/0107 |
| 10,966,406 B2* | 4/2021 | Wendling | A01K 1/0157 |
| 11,076,575 B2* | 8/2021 | Martin | A01K 1/0107 |
| 11,406,182 B1* | 8/2022 | Stoddard | A47B 23/04 |
| 12,029,196 B1* | 7/2024 | Chung | A01K 1/0353 |
| 2003/0037372 A1* | 2/2003 | Andriunas | A01K 1/0353 |
| | | | 5/2.1 |
| 2004/0177814 A1* | 9/2004 | Godshaw | A01K 1/0254 |
| | | | 119/28.5 |
| 2013/0298840 A1* | 11/2013 | Mishan | A01K 1/0107 |
| | | | 119/165 |
| 2015/0059653 A1* | 3/2015 | Martin | A01K 1/0107 |
| | | | 119/161 |
| 2016/0338316 A1* | 11/2016 | Niedwick | A01K 1/0353 |
| 2017/0251638 A1* | 9/2017 | Staloch | A01K 19/00 |
| 2020/0375144 A1* | 12/2020 | Autenrieth | A01K 1/0076 |
| 2025/0040510 A1* | 2/2025 | O'Neill | A01K 1/0254 |

* cited by examiner

MODULAR AND INTERLOCKING FOLDABLE PORTABLE DOG BED

FIELD OF THE INVENTION

The present invention is directed to portable dog beds.

BACKGROUND OF THE INVENTION

The present invention is directed to portable dog beds.

SUMMARY OF THE INVENTION

In embodiments, a portable dog bed includes a base. The base includes a first base body, a second base body, a first extension body, a first hinge, a second hinge, and a third hinge. The first base body includes a first upper base surface, a first bottom base surface, and a first handle. The second base body includes a second upper base surface, a second bottom base surface, and a second handle. The first extension body includes a first bottom extension surface, a first upper extension surface, a first locking tab, a first locking tab recess, and a first handle recess. The second extension body includes a second bottom extension surface, a second upper extension surface, a second locking tab, a second locking tab recess, and a second handle recess. The first hinge is disposed between and foldably connects the first base body and the second base body. The second hinge is disposed between and foldably connects the first base body and the first extension body. The third hinge is disposed between and foldably connects the second base body and the second extension body. The portable dog bed is moveable between a folded position and an unfolded position.

In embodiments, the first upper base surface of the first base body and the second upper base surface of the second base body include raised sidewalls.

In embodiments, the raised sidewalls are substantially L-shaped.

In embodiments, the first upper base surface and the second upper base surface include substantially rectangular surfaces and the raised sidewalls are disposed substantially on two sides of each of the first upper base surface and the second upper base surface.

In embodiments, wherein, in the unfolded position, the first bottom base surface of the first base body is disposed below the first upper base surface of the first base body, the second bottom base surface of the second base body is disposed below the second upper base surface of the second base body, the first bottom extension surface of the first extension body is disposed below the first upper extension surface of the first extension body, and the second bottom extension surface of the second extension body is disposed below the second upper extension surface of the second extension body.

In embodiments, at least one of the first bottom base surface and the second bottom base surface includes a plurality of cutouts.

In embodiments, the first hinge includes a first body and a second body. In embodiments, the first body includes a rigid material and the second body includes a flexible hinge body. In embodiments, the first body and the second body are attached to one another. In embodiments, the first body is configured to attach to at least one of the first bottom base surface and the second bottom base surface. In embodiments, the lower hinge includes a first section including a first protruding pattern; and a second section including a second protruding pattern; the first base body includes a first recessed pattern; and the second base body includes a second recessed pattern; wherein the first protruding pattern is complementary to the first recessed pattern and the second protruding pattern is complementary to the second recessed pattern.

In embodiments, at least one of the first bottom extension surface and the second bottom extension surface includes a plurality of cutouts.

In embodiments, the portable dog bed further includes an intermediate folded position, wherein the first upper extension surface is disposed proximally to the first upper base surface and the second upper extension surface is disposed proximally to the second upper base surface.

In embodiments, wherein, in the folded position, the first upper extension surface is disposed proximally to the first upper base surface; the second upper extension surface is disposed proximally to the second upper base surface; and the first bottom extension surface is disposed proximally to the second bottom extension surface.

In embodiments, the first handle is integral with the first base body and the second handle is integral with the second base body.

In embodiments, the first recess includes a first cross-sectional shape corresponding to a cross-sectional shape of the first handle and the second recess includes a second cross-sectional shape corresponding to a cross-sectional shape of the second handle.

In embodiments, the locking tab is configured to provide support to the portable dog bed when in the unfolded position.

In embodiments, the first base body, the second base body, the first extension body, and the second extension body include polyurethane, ethylene vinyl acetate, or a resilient, pliant foam material.

In embodiments, a method of assembling the portable dog bed in an unfolded position includes providing the first base body, the second base body, the first extension body, and the second extension body. The first extension body includes at least one of a locking tab and a locking recess. The second extension body includes at least one of a locking tab and a locking recess. The method includes fixing a first hinge to the first base body and the second base body. The method includes fixing a second hinge to the first base body and the first extension body. The method includes fixing a third hinge to the second base body and the second extension body. The method includes locking at least one of the locking tab of the first extension body to the locking recess of the second extension body; and the locking tab of the second extension body to the locking recess of the first extension body.

In embodiments, a method of assembling the portable dog bed in a folded position includes providing the first base body, the second base body, the first extension body, and the second extension body. The method includes fixing a hinge to the first base body and the second base body. The method includes arranging the first upper extension surface to be proximal to the first upper base surface. The method includes arranging the second upper extension surface to be proximal to the second upper base surface. The method includes arranging the first bottom extension surface to be proximal to the second bottom extension surface.

DETAILED DESCRIPTION

In the following detailed description of embodiments, reference is made to the accompanying drawings, which form a part hereof and in which are shown, by way of illustration, specific embodiments in which the invention may be practiced. Specific details disclosed herein are in every case a non-limiting embodiment representing concrete ways in which the concepts of the invention may be practiced. This serves to teach one skilled in the art to employ the present invention in virtually any appropriately detailed system, structure or manner consistent with those concepts. It will be seen that various changes and alternatives to the specific described embodiments and the details of those embodiments may be made within the scope of the invention. Because many varying and different embodiments may be made within the scope of the inventive concepts herein described and in the specific embodiments herein detailed without departing from the scope of the present invention, it is to be understood that the details herein are to be interpreted as illustrative and not as limiting.

The various directions such as "upper," "lower," "bottom," "top," "back," "front," "perpendicular", "vertical", "horizontal," "length" and "width" and so forth used in the detailed description of embodiments are made only for easier explanation in conjunction with the drawings to express the concepts of the invention. The elements in embodiments may be oriented differently while performing the same function and accomplishing the same result as obtained with the embodiments herein detailed, and such terminologies are not to be understood as limiting the concepts which the embodiments exemplify.

As used herein, the use of the word "a" or "an" when used in conjunction with the term "comprising" (or the synonymous "having" or "including") in the claims and/or the specification may mean "one," but it is also consistent with the meaning of "one or more," "at least one," and "one or more than one." In addition, as used herein, the phrase "connected to" means joined to or placed into communication with, either directly or through intermediate components.

As shown in FIGS. 1-13, embodiments of the present disclosure include a portable dog bed 10.

Figure 1:
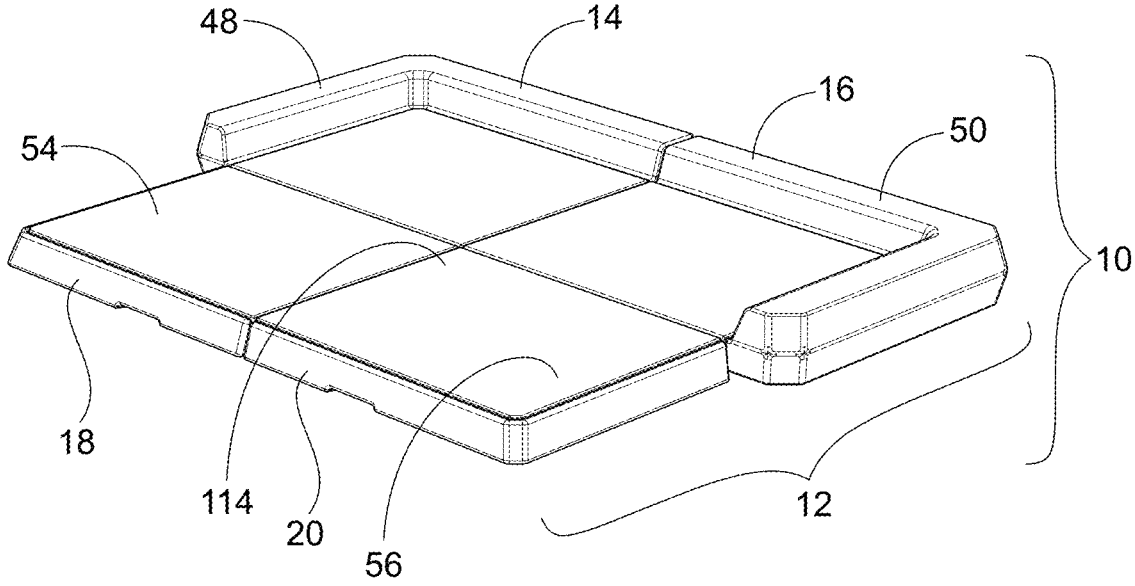
FIG. 1 is a perspective view of a portable dog bed in an unfolded position in accordance with one or more embodiments of the present invention.

In embodiments, with reference to FIG. 1, the portable dog bed 10 may include a base 12. The base 12 may include a unitary body or a plurality of bodies. The base 12 may be formed using any suitable method, including but not limited to blow molding, three-dimensional printing, injection molding, plastic extrusion, rotational molding, thermoforming, vacuum forming, compression molding, or any other suitable method known now or in the future. The base 12 may be formed of polyurethane, ethylene vinyl acetate, a resilient, pliant foam material, or any other suitable material.

In embodiments, with reference to FIG. 1, the base may include a first base body 14, a second base body 16, a first extension body 18, and a second extension body 20.

Figure 11:
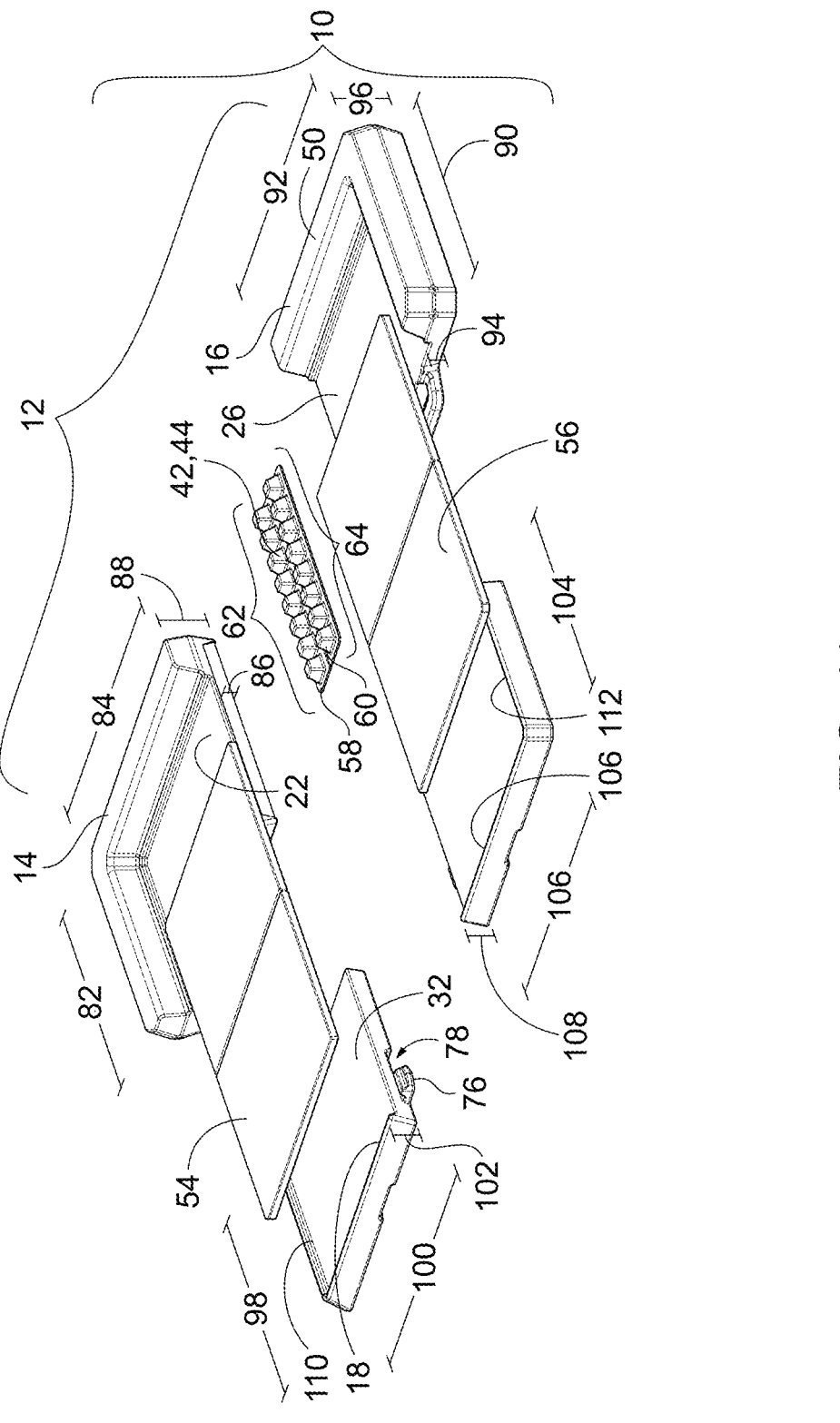
FIG. 11 is a first exploded view of a portable dog bed in accordance with one or more embodiments of the present invention.

In embodiments, with reference to FIG. 11, the first base body 14 may include a first upper base surface 22 and a first bottom base surface 24. The first base body 14 may include a length 82, a width 84, a first height 86, and a second height 88.

In embodiments, with reference to FIG. 11, the second base body 16 may include a second upper base surface 26 and a second bottom base surface 28. The second base body 16 may include a length 90, a width 92, a first height 94, and a second height 96.

In embodiments, with reference to FIG. 11, the first extension body 18 may include a first bottom extension surface 30 and a first upper extension surface 32. The first extension body 18 may include a length 98, a width 100, and a height 102. The first extension body 18 may include a lip 110 disposed around at least a portion of an outer edge of the first upper extension surface 32.

In embodiments, with reference to FIG. 11, the second extension body 20 may include a second bottom extension surface 34 and a second upper extension surface 36. The second extension body 20 may include a length 104, a width 106, and a height 108. The second extension body 20 may include a lip 112 disposed around at least a portion of an outer edge of the first upper extension surface 36.

The portable dog bed 10 may be configured to have at least two configurations. As shown in FIGS. 1-4, a first position may be an unfolded configuration. As shown in FIGS. 5-10, a second configuration may be a folded configuration. The portable dog bed may be configured to have three or more configurations, including intermediate folded configurations.

In embodiments, with reference to FIGS. 1 and 4, when in the unfolded configuration, the first bottom base surface 24 may be disposed below the first upper base surface 22. The second bottom base surface 28 may be disposed below the second upper base surface 26. The first bottom extension surface 30 may be disposed below the first upper extension surface 32. The second bottom extension surface 34 may be disposed below the second upper extension surface 36.

In embodiments, a method of assembling the portable dog bed 10 in an unfolded position may include providing the first base body 14, the second base body 16, the first extension body 18, and the second extension body 20. The first extension body 18 may include at least one of a locking tab 74, 76 and a locking recess 78, 80. The second extension body 20 may include at least one of a locking tab 74, 76 and a locking recess 78, 80. The method may include fixing a first hinge 42 to the first base body 14 and the second base body 16. The method may include fixing a second hinge 54 to the first base body 14 and the first extension body 18. The method may include fixing a third hinge 56 to the second base body 16 and the second extension body 20. The method may include locking at least one of the locking tab 74, 76 of the first extension body 18 to the locking recess 78, 80 of the second extension body 20 and the locking tab 74, 76 of the second extension body 20 to the locking recess 78, 80 of the first extension body 18.

In embodiments, when in an intermediate folded configuration, the first upper extension surface 32 may be disposed proximally to the first upper base surface 22. The second upper extension surface 36 may be disposed proximally to the second upper base surface 26.

Figure 6:
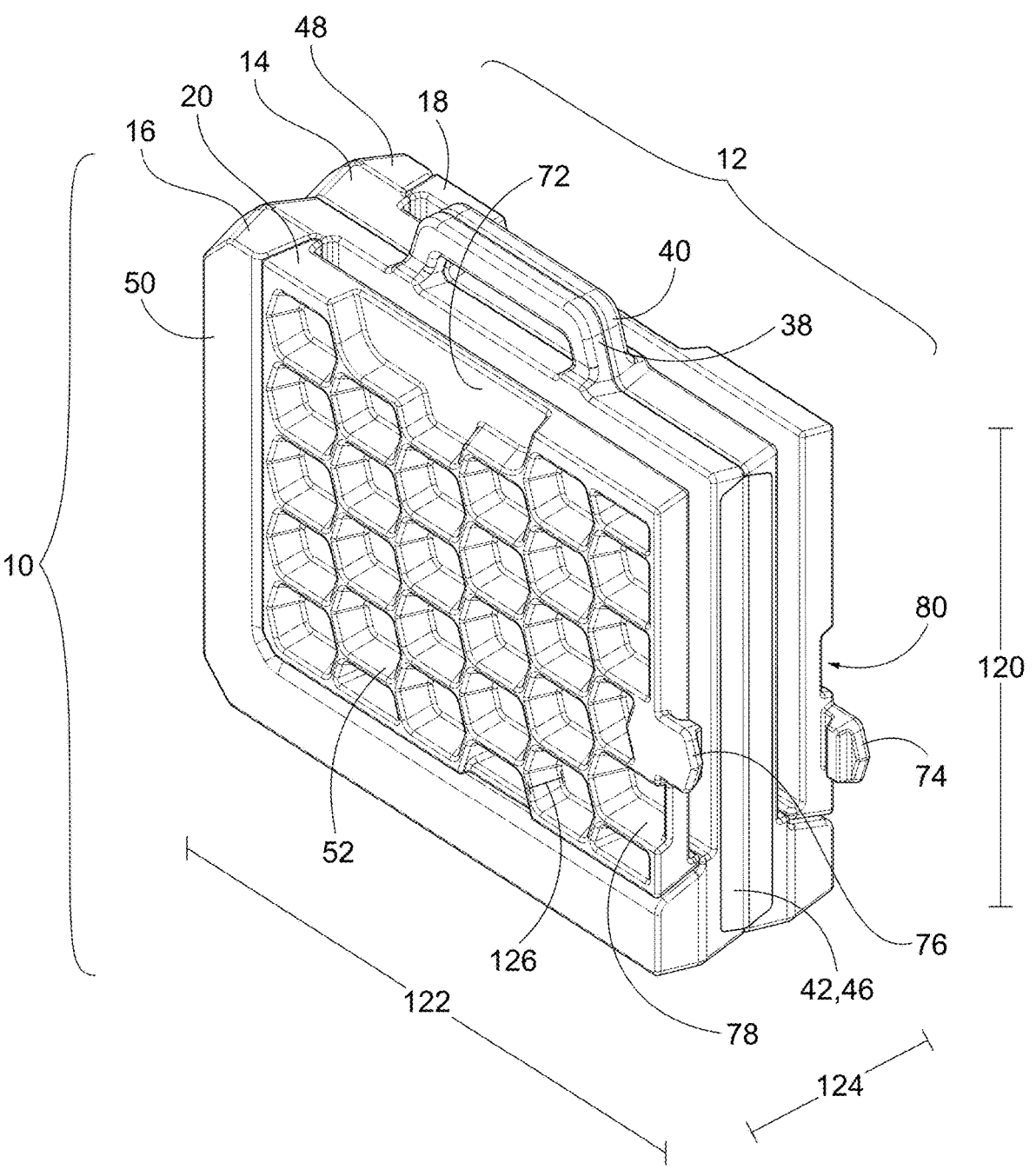
FIG. 6 is a second perspective view of a portable dog bed in a folded position in accordance with one or more embodiments of the present invention.
Figure 7:
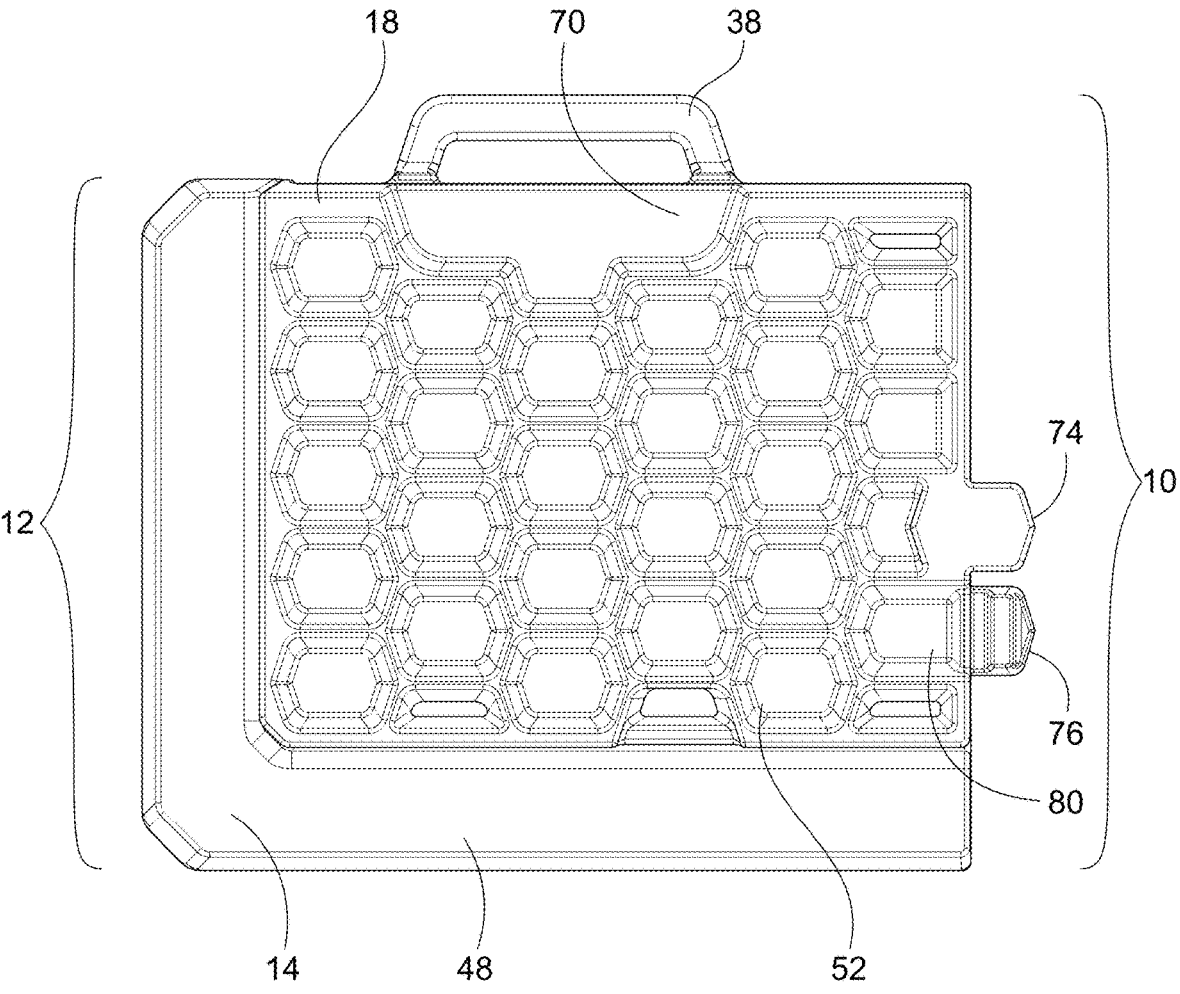
FIG. 7 is a first side view of a portable dog bed in a folded position in accordance with one or more embodiments of the present invention.
Figure 8:
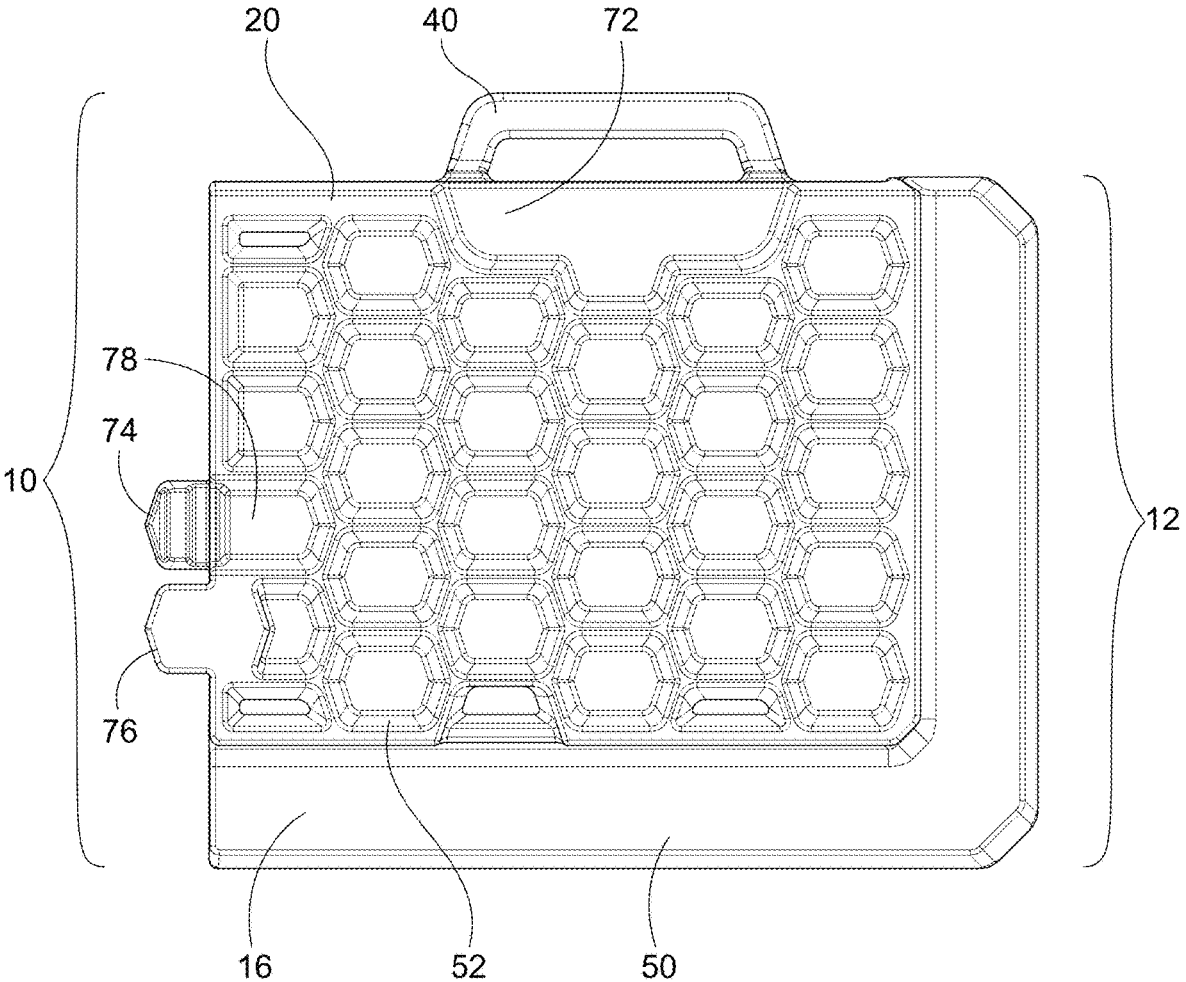
FIG. 8 is a second side view of a portable dog bed in a folded position in accordance with one or more embodiments of the present invention.
Figure 9:
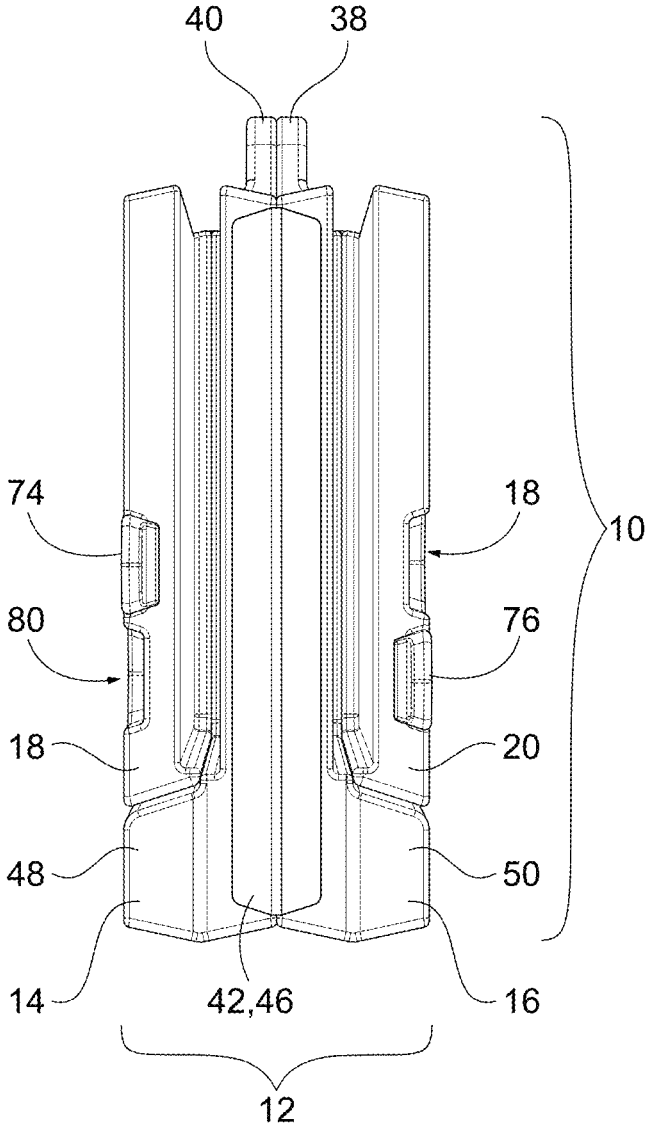
FIG. 9 is a front view of a portable dog bed in a folded position in accordance with one or more embodiments of the present invention.
Figure 10:
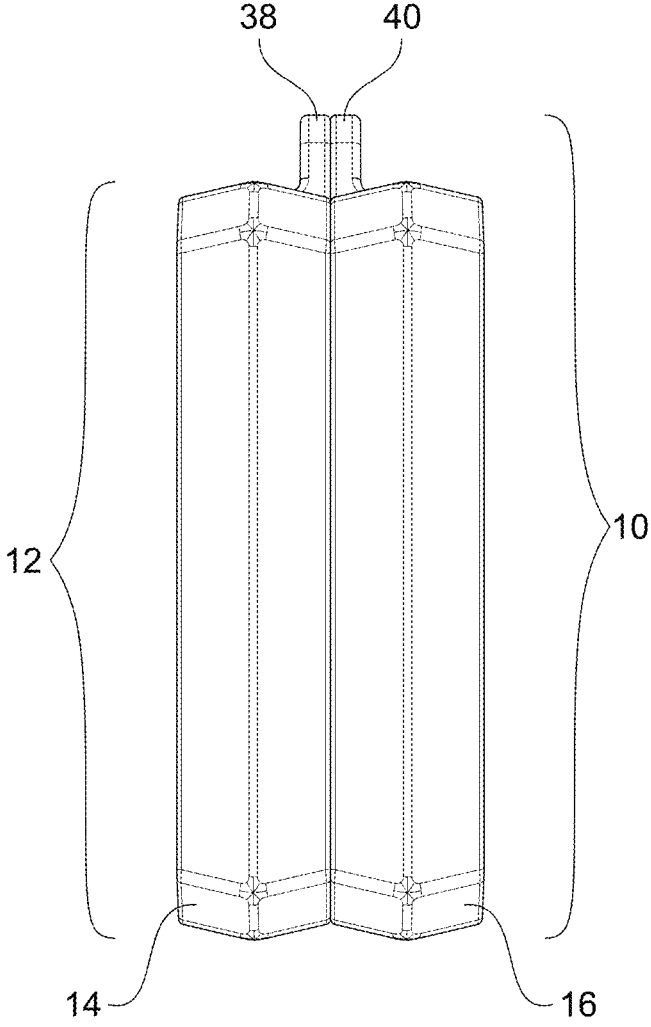
FIG. 10 is a rear view of a portable dog bed in a folded position in accordance with one or more embodiments of the present invention.

In embodiments, with reference to FIGS. 5-10, when in the folded configuration, the first upper extension surface 32 may be disposed proximally to the first upper base surface 22. The second upper extension surface 36 may be disposed proximally to the second upper base surface 26. The first bottom extension surface 30 may be disposed proximally to the second bottom extension surface 34. Referring to FIG. 6, when in the folded configuration, the portable dog bed 10 may comprise a height 120, a width 122, and a thickness 124. The height 120 may be between 10 inches and 30 inches. The width 122 may be between 10 inches and 30 inches. The thickness 122 may be between 2 inches and 10 inches.

In embodiments, a method of assembling the portable dog bed 10 in a folded position may include providing the first base body 14, the second base body 16, the first extension body 18, and the second extension body 20. The method may include fixing a first hinge 42 to the first base body 14 and the second base body 16. The method may include arranging the first upper extension surface 32 to be proximal to the first upper base surface 22. The method may include arranging the second upper extension surface 36 to be proximal to the second upper base surface 26. The method may include arranging the first bottom extension surface 30 to be proximal to the second bottom extension surface 34.

In embodiments, with reference to FIGS. 3 and 5-10, the base 10 may include a first handle 38. In embodiments, the base 10 may include a second handle 40. The first handle 38 may be integral with one of the first base body 14, the second base body 16, the first extension body 18, and the second extension body 20. The second handle 40 may be integral with one of the first base body 14, the second base body 16, the first extension body 18, and the second extension body 20. In embodiments, the first handle 38 may be disposed on the first base body 14. In embodiments, the second handle 40 may be disposed on the second base body 16.

Figure 12:
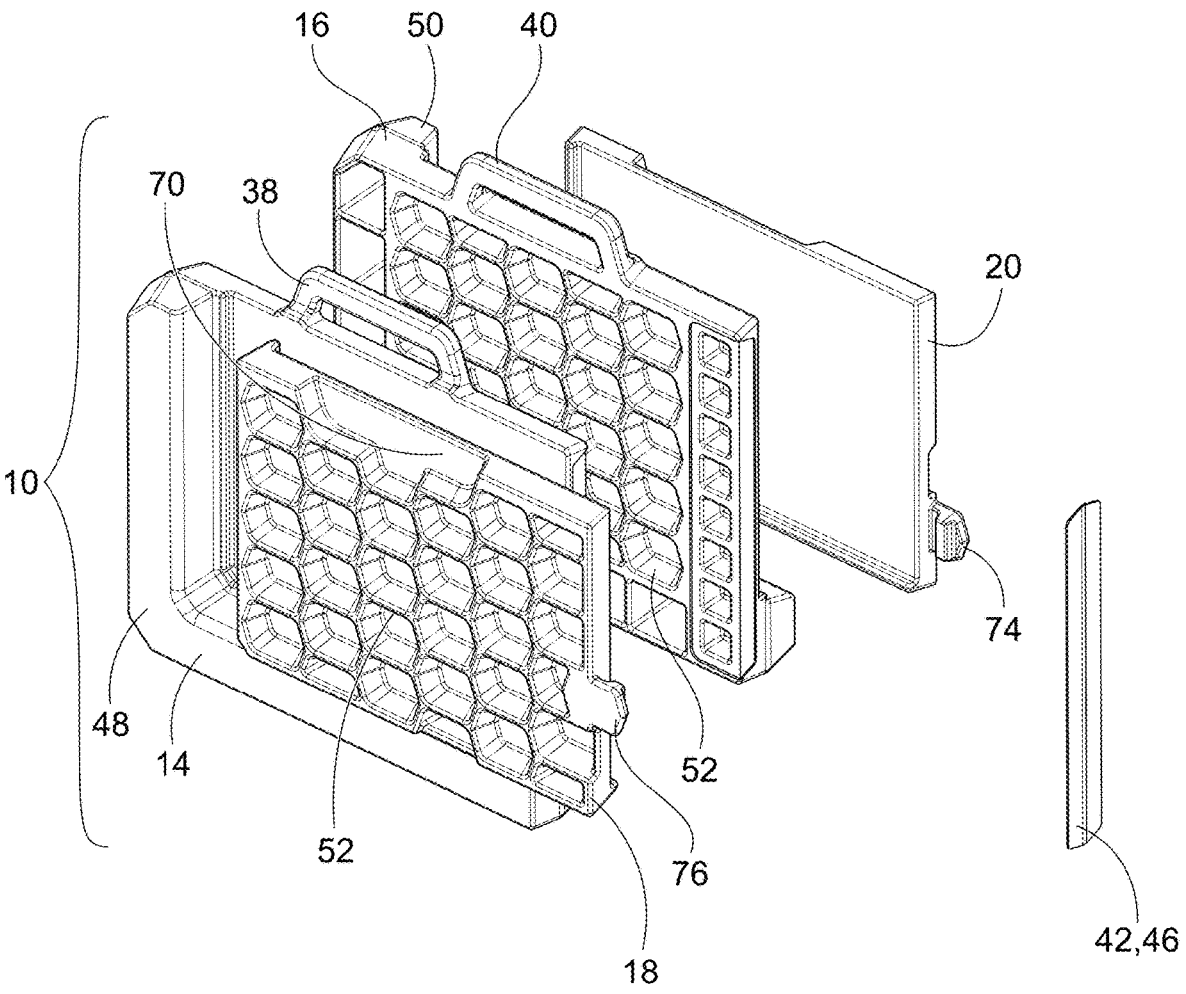
FIG. 12 is a second exploded view of a portable dog bed in accordance with one or more embodiments of the present invention.
Figure 13:
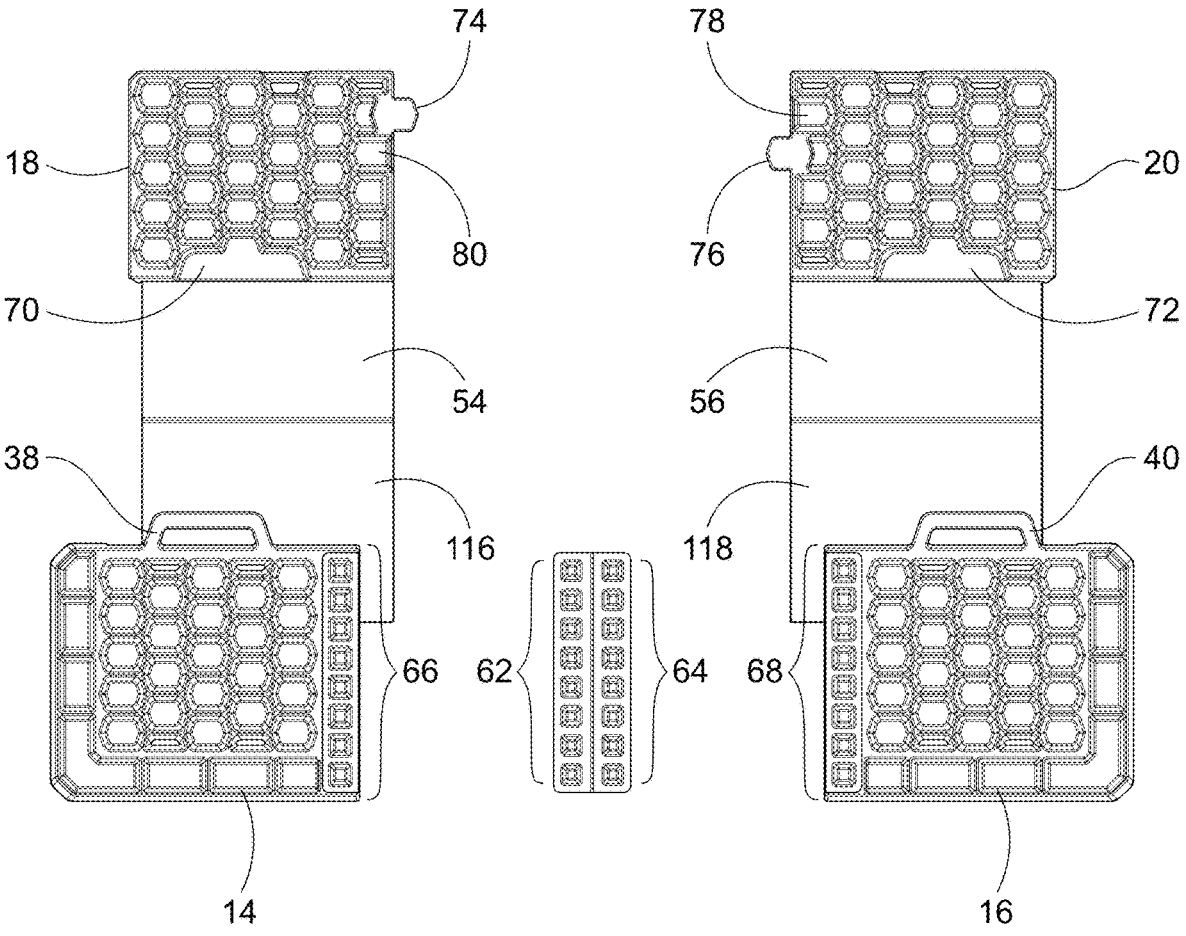
FIG. 13 is a third exploded view of a portable dog bed in accordance with one or more embodiments of the present invention.

In embodiments, with reference to FIGS. 11-13, the base 10 includes a first hinge 42 disposed between the first base body 14 and the second base body 16. The first hinge 42 may be configured to foldably connect the first base body 14 and the second base body 16. The first hinge 42 may include a first hinge body 44. The first hinge 42 may include a second hinge body 46. The first hinge body 44 may include a first section 58. The first hinge body 44 may include a second section 60. The first hinge body 44 may include a protruding pattern 62, 64. The first section 58 may include a first protruding pattern 62. The second section 60 may include a second protruding pattern 64. The first hinge body 44 may be formed of EVA, fabric, a rigid material, or any other suitable material. The first hinge body 44 may include two or more layers of material. The two or more layers of material may include an adhesive layer, an EVA foam layer, a fabric layer, or any other suitable layers or combinations of layers. The second hinge body 46 may include a flexible hinge body. The second hinge body 46 may be formed of cloth, laminate, or any other suitable material. The first hinge body 44 and the second hinge body 46 may be unitary or may include two or more bodies. If the first hinge body 44 and the second hinge body 46 include two or more bodies, they may be connected using any suitable method including application of adhesive, sewing together, or engagement of retention mechanisms.

In embodiments, with reference to FIG. 13, at least one of the first base body 14, the second base body 16, the first extension body 18, and the second extension body 20 may include a recessed pattern 66, 68. The first base body 14 may include a first recessed pattern 66. The second base body 14 may include a second recessed pattern 66. The recessed pattern 66, 68 may be complementary to the protruding pattern 62, 64. The first recessed pattern 66 may be complementary to the first protruding pattern 62. The second recessed pattern 68 may be complementary to the second protruding pattern 64.

Figure 2:
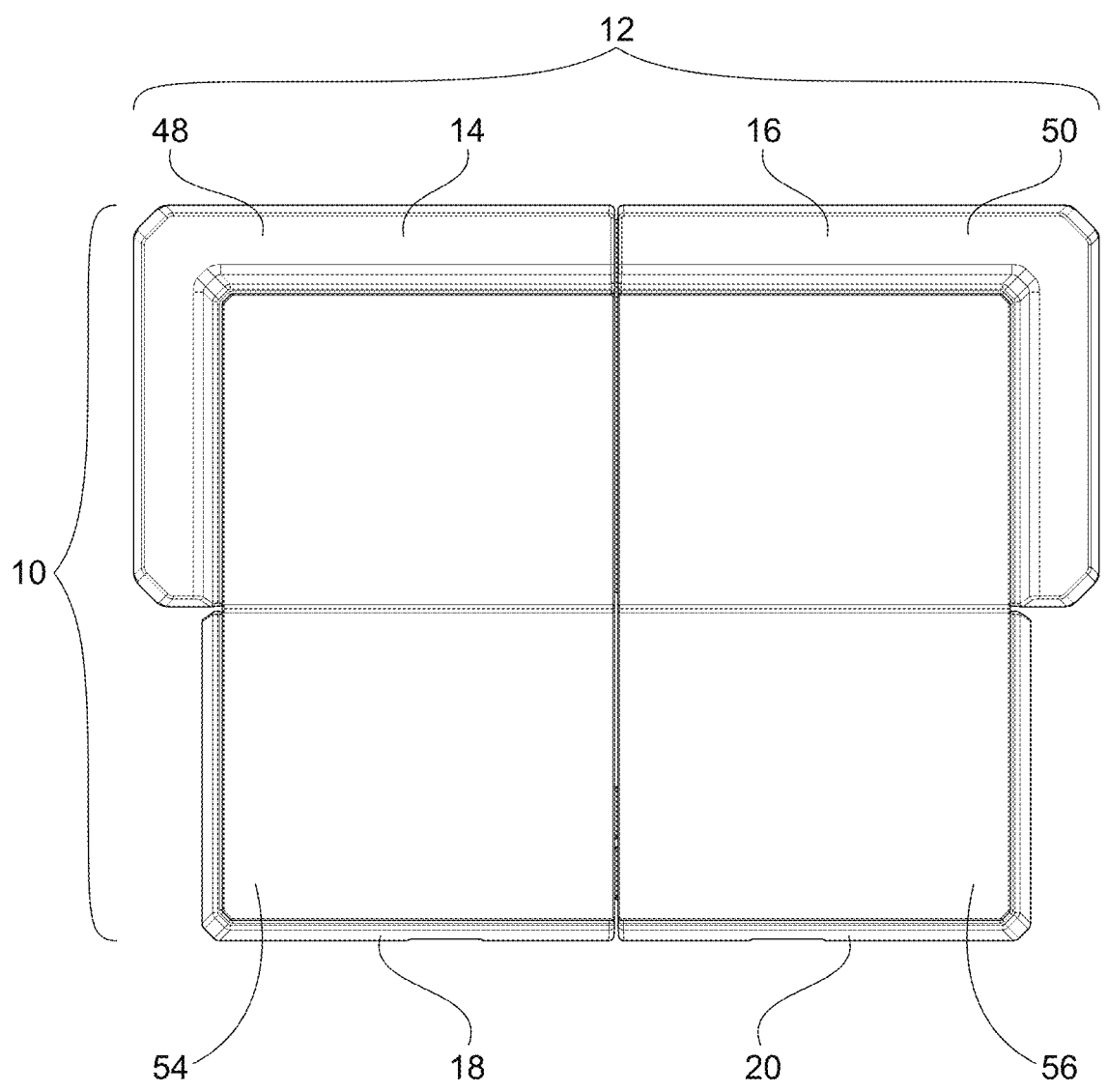
FIG. 2 is a top view of a portable dog bed in an unfolded position in accordance with one or more embodiments of the present invention.
Figure 4:
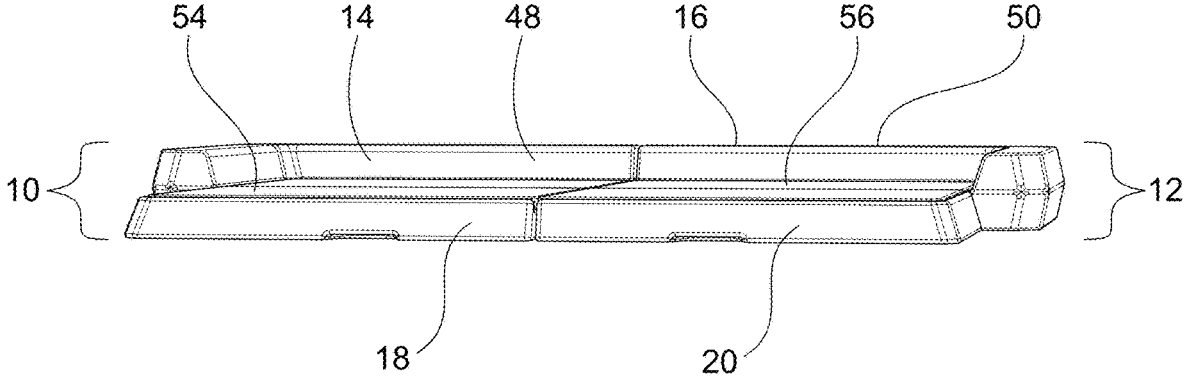
FIG. 4 is a front view of a portable dog bed in an unfolded position in accordance with one or more embodiments of the present invention.
Figure 5:
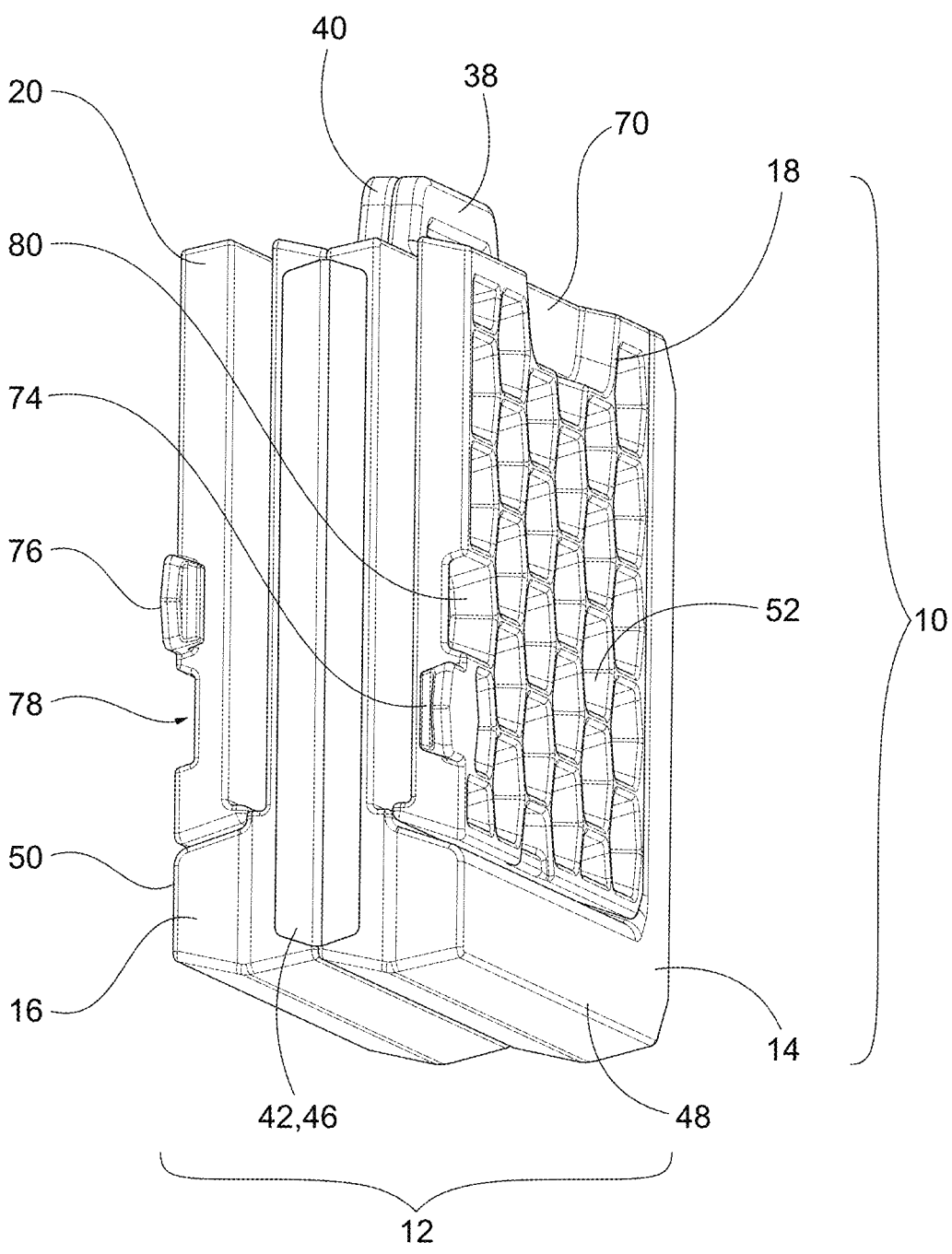
FIG. 5 is a first perspective view of a portable dog bed in a folded position in accordance with one or more embodiments of the present invention.

In embodiments, with reference to FIGS. 1-2 and 4, the base may include at least one raised sidewall 48, 50. The at least one raised sidewall 48, 50 may be disposed on at least one of the first base body 14, the second base body 16, the first extension body 18, and the second extension body 20. The first base body 14 may include a first raised sidewall 48. The second base body 16 may include a second raised sidewall 50. The first raised sidewall 48 may be generally L-shaped, disposed on at least a portion of an outer perimeter of the first base body 14. The first raised sidewall 48 may be disposed substantially on two sides of a rectangular first upper base surface 22. The second raised sidewall 50 may be generally L-shaped, disposed on at least a portion of an outer perimeter of the second base body 16. The second raised sidewall 50 may be disposed substantially on two sides of a rectangular second upper base surface 26. The first raised sidewall 48 may be formed between the first height 86 and the second height 88 of the first base body 14. The second raised sidewall 50 may be formed between the first height 94 and the second height 96 of the second base body 16.

In embodiments, with reference to FIGS. 3, 5-8, and 12, at least one of the first base body 14, the second base body 16, the first extension body 18, and the second extension body 20 includes a plurality of cutouts 52. The plurality of cutouts 52 may be configured to reduce weight of at least one of the first base body 14, the second base body 16, the first extension body 18, and the second extension body 20. The plurality of cutouts 52 may be configured to increase rigidity of at least one of the first base body 14, the second base body 16, the first extension body 18, and the second extension body 20. In embodiments, the plurality of cutouts 52 include a cutout depth 126. The cutout depth 126 may be less than or equal to the first height 86 of the first base body 14, the first height 94 of the second base body 16, the height 102 of the first extension body 18, or the height 108 of the second extension body 20. The cutouts 52 may have any suitable cross-sectional dimension. The cutouts 52 may have any suitable cross-sectional shape. The cutouts 52 may have any suitable configuration.

In embodiments, the portable dog bed further comprises additional hinge 54, 56 (FIG. 13). A second hinge 54 may connect the first base body 14 to the first extension body 18. The second hinge 54 may be configured to foldably connect the first base body 14 to the first extension body 18. A third hinge 56 may connect the second base body 16 to the first extension body 20. The second hinge 54 may be disposed between the first raised sidewall 48 of the first base body 14 and the lip 110 of the first extension body 18. The third hinge 56 may be configured to foldably connect the second base body 14 to the second extension body 20. The third hinge 56 may be disposed between the second raised sidewall 50 of the second base body 16 and the lip 112 of the second extension body 20. The second hinge 54 and the third hinge 56 may form a sleeping surface 114 of the portable dog bed 10. The second hinge 54 may include a first connection surface 116 which contacts at least a portion of the first upper base surface 22 and at least a portion of the first upper extension surface 32. The third hinge 56 may include a second connection surface 118 which contacts at least a portion of the second upper base surface 26 and at least a portion of the second upper extension surface 36. The second hinge 54 may be formed of a durable fabric. The third hinge 56 may be formed of a durable fabric. The second hinge 54 may be formed of a laminate material. The third hinge 56 may be formed of a durable laminate material.

Figure 3:
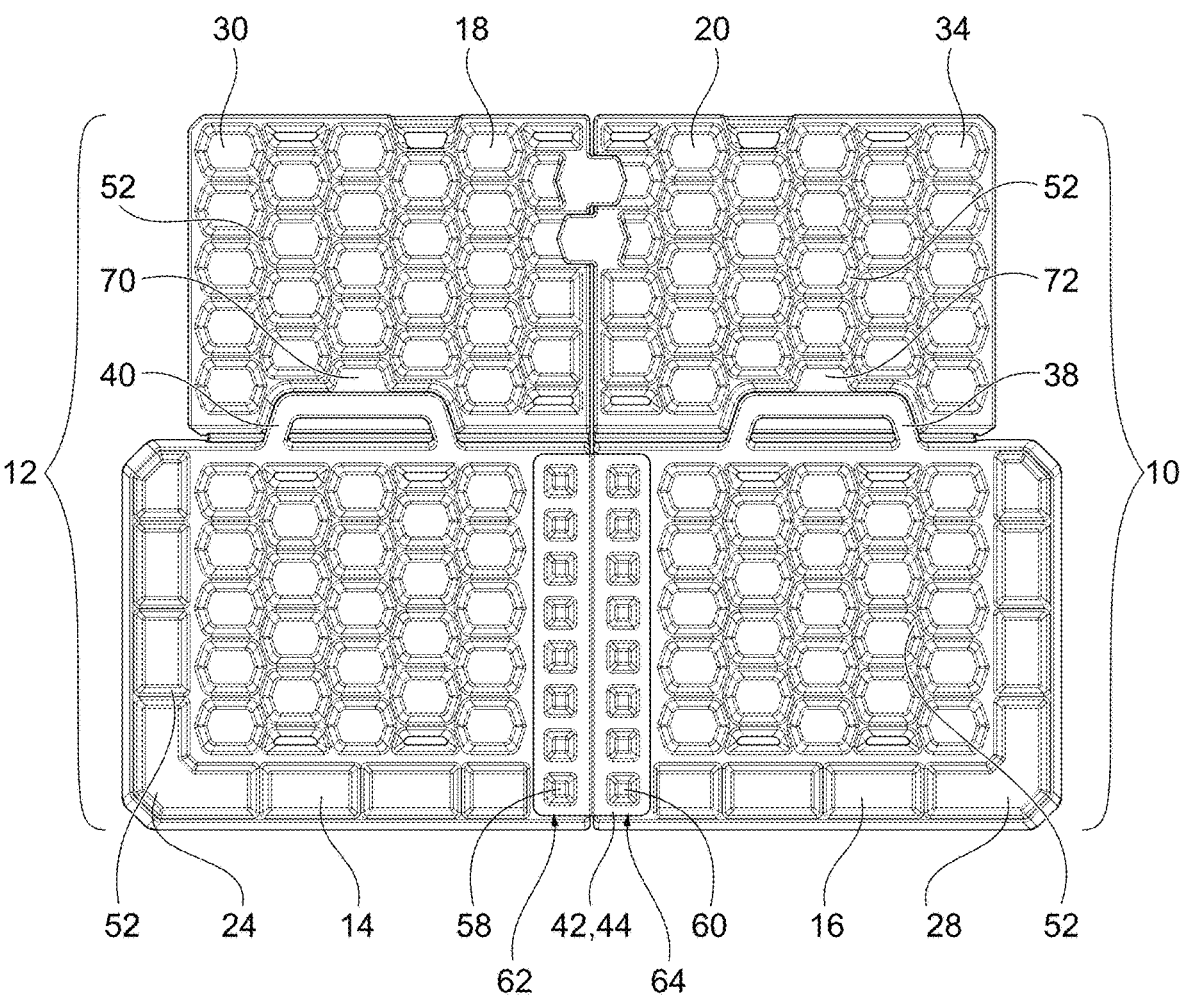
FIG. 3 is a bottom view of a portable dog bed in an unfolded position in accordance with one or more embodiments of the present invention.

In embodiments, with reference to FIG. 3, at least one of the first base body 14, the second base body 16, the first extension body 18, and the second extension body 20 includes an integral handle recess 70, 72. The base 10 may include a first handle recess 70. With reference to FIG. 13, the first extension body 18 may include the first handle recess 70 disposed on the first bottom base surface 24. The base 10 may include a second handle recess 72. The second extension body 20 may include the second handle recess 72 disposed on the second bottom base surface 28. The first handle recess 70 may be configured to receive at least one of the first handle 38 and the second handle 40. The second handle recess 72 may be configured to receive at least one of the first handle 38 and the second handle 40. The first handle recess 70 may include a first cross-sectional shape corresponding to a cross-sectional shape of the first handle 38. The second handle recess 72 may include a second cross-sectional shape corresponding to a cross-sectional shape of the second handle 40.

In embodiments, with reference to FIGS. 5-9 and 11-12, at least one of the first base body 14, the second base body 16, the first extension body 18, and the second extension body 20 may include a locking tab 74, 76. The locking tab 74, 76 may be configured to provide support to the portable dog bed 10 when in the unfolded configuration. The first base body 14, the second base body 16, the first extension body 18, and the second extension body 20 may include a first locking tab 74. The first locking tab 74 may be disposed on the first bottom extension surface 30. The first locking tab 74 may be configured to releasably engage the second extension body 20. The first base body 14, the second base body 16, the first extension body 18, and the second extension body 20 may include a second locking tab 76. The second locking tab 76 may be disposed on the second bottom extension surface 34. The second locking tab 76 may be configured to releasably engage the first extension body 18. The first base body 14, the second base body 16, the first extension body 18, and the second extension body 20 may include an integral locking recess 78, 80. The first base body 14, the second base body 16, the first extension body 18, and the second extension body 20 may include a first integral locking recess 78. The first base body 14, the second base body 16, the first extension body 18, and the second extension body 20 may include a second integral locking recess 80.

In embodiments, the portable dog bed 10 may be provided with a carrier case.

The invention claimed is:

1. A portable dog bed comprising:
 a base comprising:
  a first base body comprising a first bottom base surface, a first upper base surface, and a first handle;
  a second base body comprising a second bottom base surface, a second upper base surface, and a second handle;
  a first extension body comprising a first bottom extension surface, a first upper extension surface, a first locking tab disposed on the first bottom extension surface, a first locking recess disposed on the first bottom extension surface, and a first handle recess disposed on the first bottom extension surface, wherein the first locking tab is adapted to releasably engage a second locking recess of a second extension body, and wherein the first handle is adapted to releasably engage the first handle recess;
  the second extension body comprising a second bottom extension surface and a second upper extension surface, a second locking tab disposed on the second bottom extension surface, the second locking recess of the second extension body disposed on the first bottom extension surface, and a second handle recess disposed on the second bottom extension surface, wherein the second locking tab is adapted to releasably engage the first locking recess of the first extension body, and wherein the second handle is adapted to releasably engage the second handle recess;
  a first hinge disposed between and foldably connecting the first base body and the second base body;
  a second hinge disposed between and foldably connecting the first base body and the first extension body;
  a third hinge disposed between and foldably connecting the second base body and the second extension body;
 wherein the portable dog bed is configured to be moveable between a folded configuration and an unfolded configuration.

2. The portable dog bed of claim 1, wherein the first upper base surface of the first base body and the second upper base surface of the second base body further comprise raised sidewalls.

3. The portable dog bed of claim 2, wherein the raised sidewalls are substantially L-shaped.

4. The portable dog bed of claim 2, wherein the first upper base surface and the second upper base surface comprise substantially rectangular surfaces and wherein the raised sidewalls are disposed substantially on two sides of each of the first upper base surface and the second upper base surface.

5. The portable dog bed of claim 1, wherein, in the unfolded configuration,
 the first bottom base surface of the first base body is disposed below the first upper base surface of the first base body,
 the second bottom base surface of the second base body is disposed below the second upper base surface of the second base body, the first bottom extension surface of the first extension body is disposed below the first upper extension surface of the first extension body, and the second bottom extension surface of the second extension body is disposed below the second upper extension surface of the second extension body.

6. The portable dog bed of claim 1, wherein at least one of the first upper base surface and the second upper base surface comprises a plurality of cutouts.

7. The portable dog bed of claim 6, wherein the first hinge comprises a first hinge body and a second hinge body.

8. The portable dog bed of claim 7, wherein the first hinge body comprises a rigid material and the second hinge body comprises a flexible hinge body.

9. The portable dog bed of claim 8, wherein the first hinge body and the second hinge body are attached to one another.

10. The portable dog bed of claim 8, wherein the first hinge body is configured to attach to at least one of the first upper base surface and the second upper base surface.

11. The portable dog bed of claim 7, wherein the first hinge body comprises:

a first section comprising a first protruding pattern; and a second section comprising a second protruding pattern;

the first base body comprises a first recessed pattern; and the second base body comprises a second recessed pattern;

wherein the first protruding pattern is complementary to the first recessed pattern and the second protruding pattern is complementary to the second recessed pattern.

12. The portable dog bed of claim 1, wherein at least one of the first bottom extension surface and the second bottom extension surface comprises a plurality of cutouts.

13. The portable dog bed of claim 1, wherein the dog bed is further configured to be moveable to an intermediate folded configuration, wherein the first upper extension surface is disposed proximally to the first upper base surface and the second upper extension surface is disposed proximally to the second upper base surface.

14. The portable dog bed of claim 1, wherein, in the folded configuration, the first upper extension surface is disposed proximally to the first upper base surface;

the second upper extension surface is disposed proximally to the second upper base surface; and the first bottom extension surface is disposed proximally to the second bottom extension surface.

15. The portable dog bed of claim 1, wherein the first handle is integral with the first base body and the second handle is integral with the second base body.

16. The portable dog bed of claim 15, wherein the first recess comprises a first cross-sectional shape corresponding to a cross-sectional shape of the first handle and the second recess comprises a second cross-sectional shape corresponding to a cross-sectional shape of the second handle.

17. The portable dog bed of claim 16, wherein the first and second locking tabs are configured to provide support to the portable dog bed when in the unfolded configuration.

18. The portable dog bed of claim 1, wherein the first base body, the second base body, the first extension body, and the second extension body comprise polyurethane, ethylene vinyl acetate, or a resilient, pliant foam material.

* * * * *